United States Patent
Cheung

(10) Patent No.: US 7,354,189 B2
(45) Date of Patent: Apr. 8, 2008

(54) CULINARY UTENSIL

(75) Inventor: Paul Cheung, City One Shatin (HK)

(73) Assignee: Maxpat Trading & Marketing (Far East) Limited, Hong Kong (HK)

( * ) Notice: Subject to any disclaimer, the term of this patent is extended or adjusted under 35 U.S.C. 154(b) by 0 days.

(21) Appl. No.: 11/496,297

(22) Filed: Jul. 31, 2006

(65) Prior Publication Data

US 2006/0262638 A1 Nov. 23, 2006

Related U.S. Application Data

(63) Continuation of application No. 10/682,232, filed on Oct. 9, 2003, now abandoned.

(30) Foreign Application Priority Data

Jan. 30, 2003 (GB) .................... 0302180.5

(51) Int. Cl.
*A47J 43/10* (2006.01)
(52) U.S. Cl. ...................... 366/129; 366/343
(58) Field of Classification Search ............... 366/129, 366/343, 342; 15/141.1, 144.1, 229.11, 229.13, 15/236.01, 236.08, 236.09; D7/690
See application file for complete search history.

(56) References Cited

U.S. PATENT DOCUMENTS

| | | | |
|---|---|---|---|
| 34,098 A | 1/1862 | Fell | 30/147 |
| D34,098 S * | 2/1901 | Fell | D7/380 |
| 678,586 A | 7/1901 | Preston | 15/141.1 |
| 781,917 A | 2/1905 | Smith | 416/70 R |
| 948,750 A | 2/1910 | Washburn | 416/70 R |
| 973,847 A | 10/1910 | Bennett | 15/141.1 |
| 1,134,170 A | 4/1915 | Washburn | 416/70 R |
| 1,241,307 A | 9/1917 | Tompkins | 366/129 |
| 1,410,199 A | 3/1922 | Low | |
| 1,447,870 A * | 3/1923 | Kusnitt | 294/33 |
| 1,530,716 A | 3/1925 | Doerr | 366/129 |
| 1,627,315 A | 5/1927 | Boynton | 416/76 |
| 1,735,278 A | 11/1929 | Hertzberg | 15/229.9 |
| 2,442,326 A | 5/1948 | Pribil | 259/144 |
| 2,643,907 A | 6/1953 | Thomas | 294/7 |
| 2,670,938 A | 3/1954 | Wittmann | 366/343 |
| 2,798,702 A * | 7/1957 | Fjellstedt | 416/72 |
| 2,836,402 A | 5/1958 | Barnes | 416/70 R |
| 2,906,510 A | 9/1959 | Harris | 15/141.1 |
| 3,031,707 A | 5/1962 | Wiley | 15/147.2 |
| 4,026,532 A | 5/1977 | Madan | 259/104 |
| D289,958 S | 5/1987 | Callender | D7/43 |
| 5,725,305 A | 3/1998 | Delbor | 366/129 |
| D406,216 S | 3/1999 | Renner | D7/690 |
| 5,947,595 A | 9/1999 | Eurisch et al. | 366/129 |
| 6,155,620 A | 12/2000 | Armstrong | 294/57 |

FOREIGN PATENT DOCUMENTS

DE 159759 4/1905

(Continued)

*Primary Examiner*—Tony G. Soohoo
(74) *Attorney, Agent, or Firm*—Ostrolenk, Faber, Gerb & Soffen, LLP

(57) ABSTRACT

A culinary whisk comprising an elongate handle, and a generally planar utility portion connected to the handle so as to be pivotably movable about an axis perpendicular to the axis of the handle.

11 Claims, 5 Drawing Sheets

FOREIGN PATENT DOCUMENTS

| | | |
|---|---|---|
| DE | 403798 | 10/1924 |
| DE | 241195 | 7/1946 |
| EP | 0 300 442 A2 | 7/1988 |
| FR | 403.823 | 6/1909 |
| GB | 618185 | 2/1949 |
| WO | WO 02/21945 A2 | 3/2002 |

\* cited by examiner

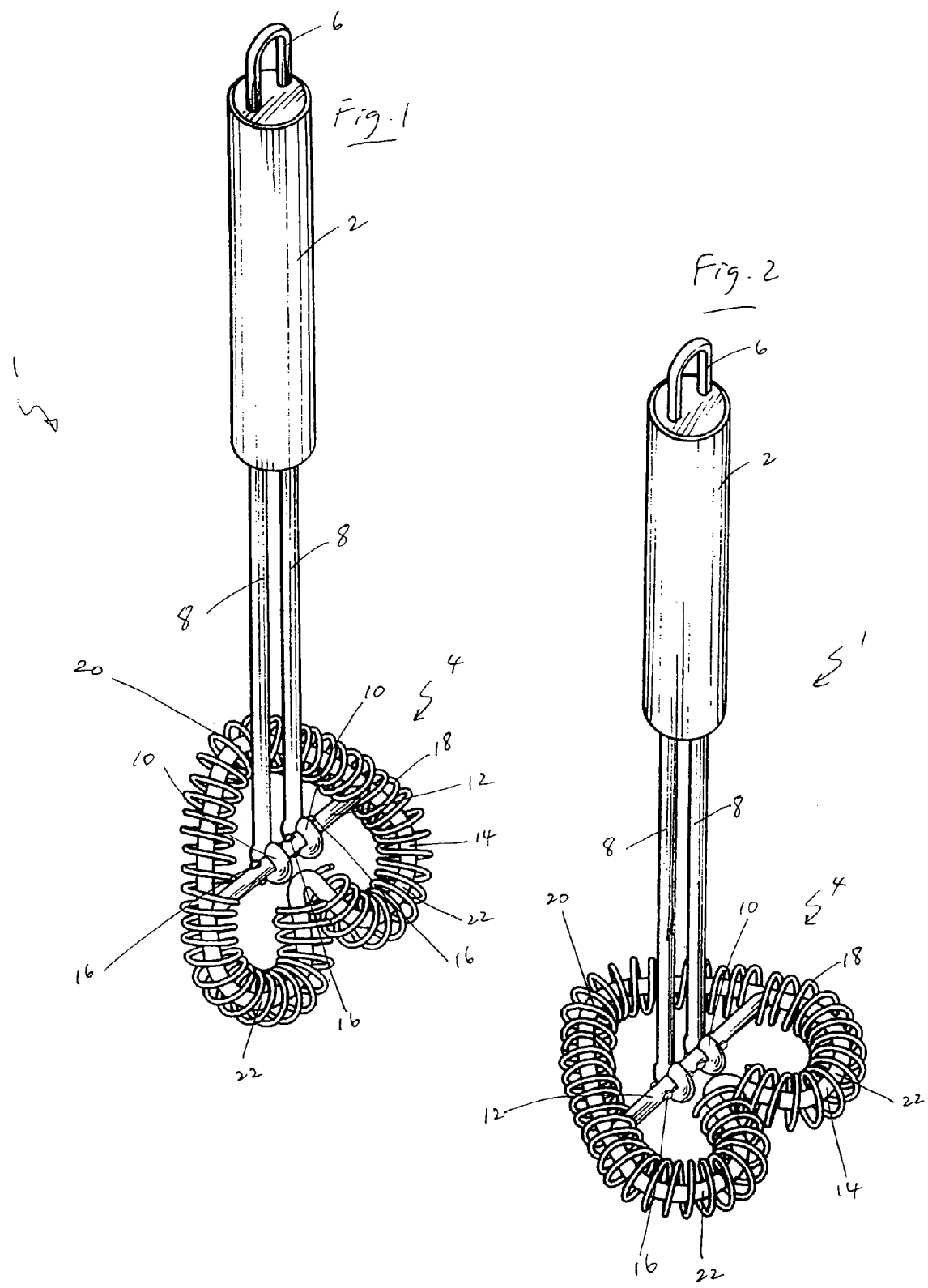

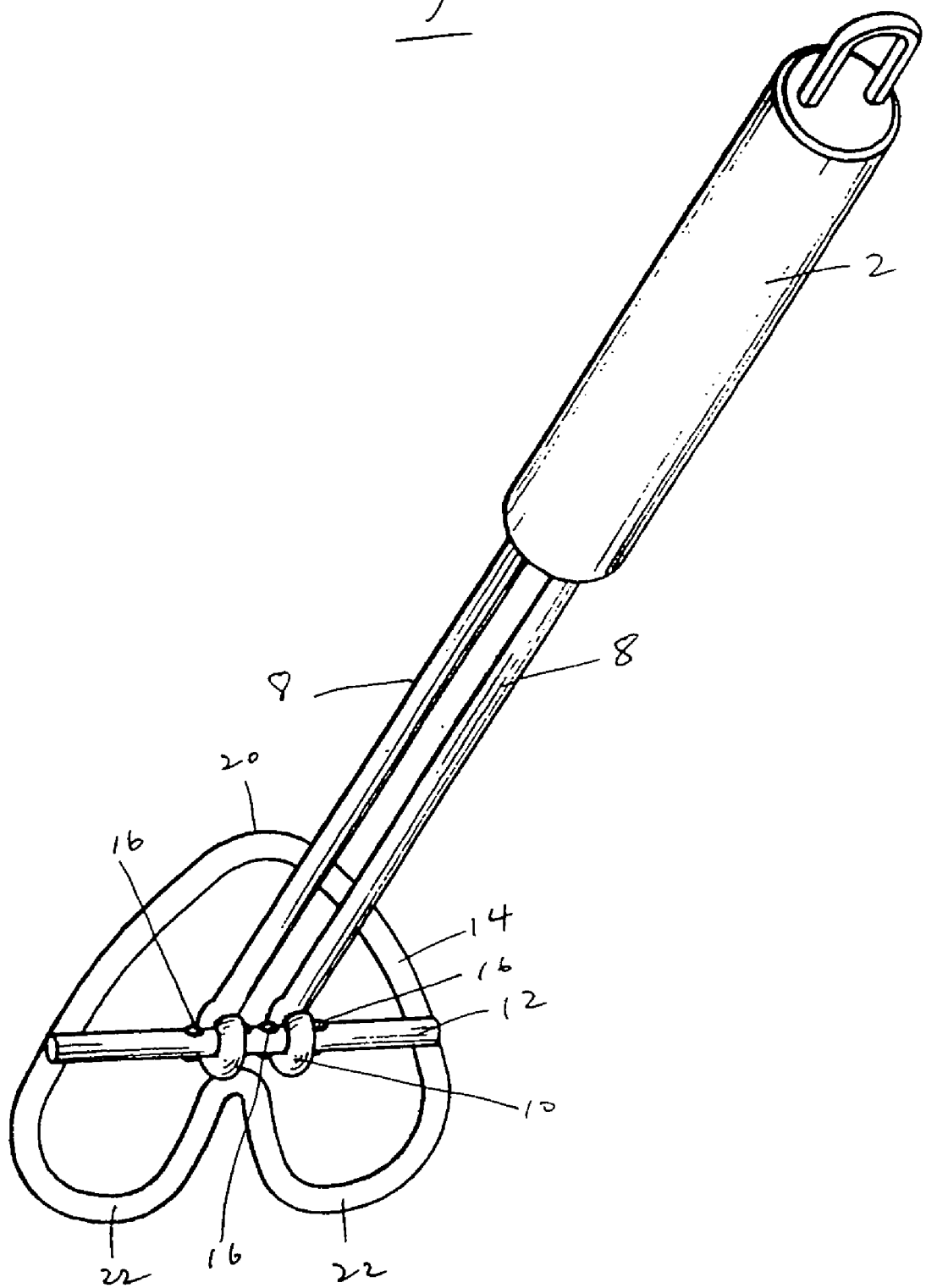

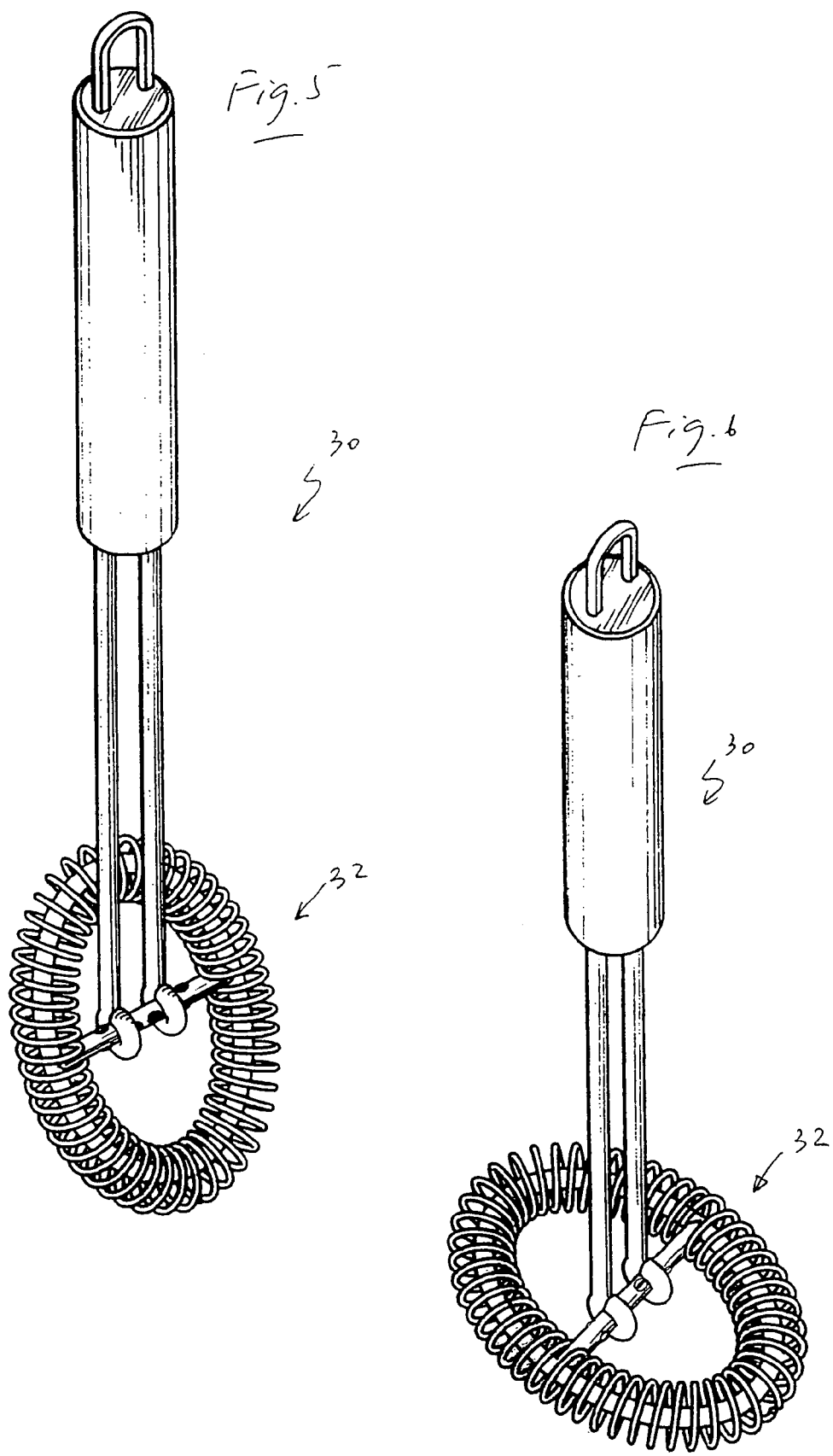

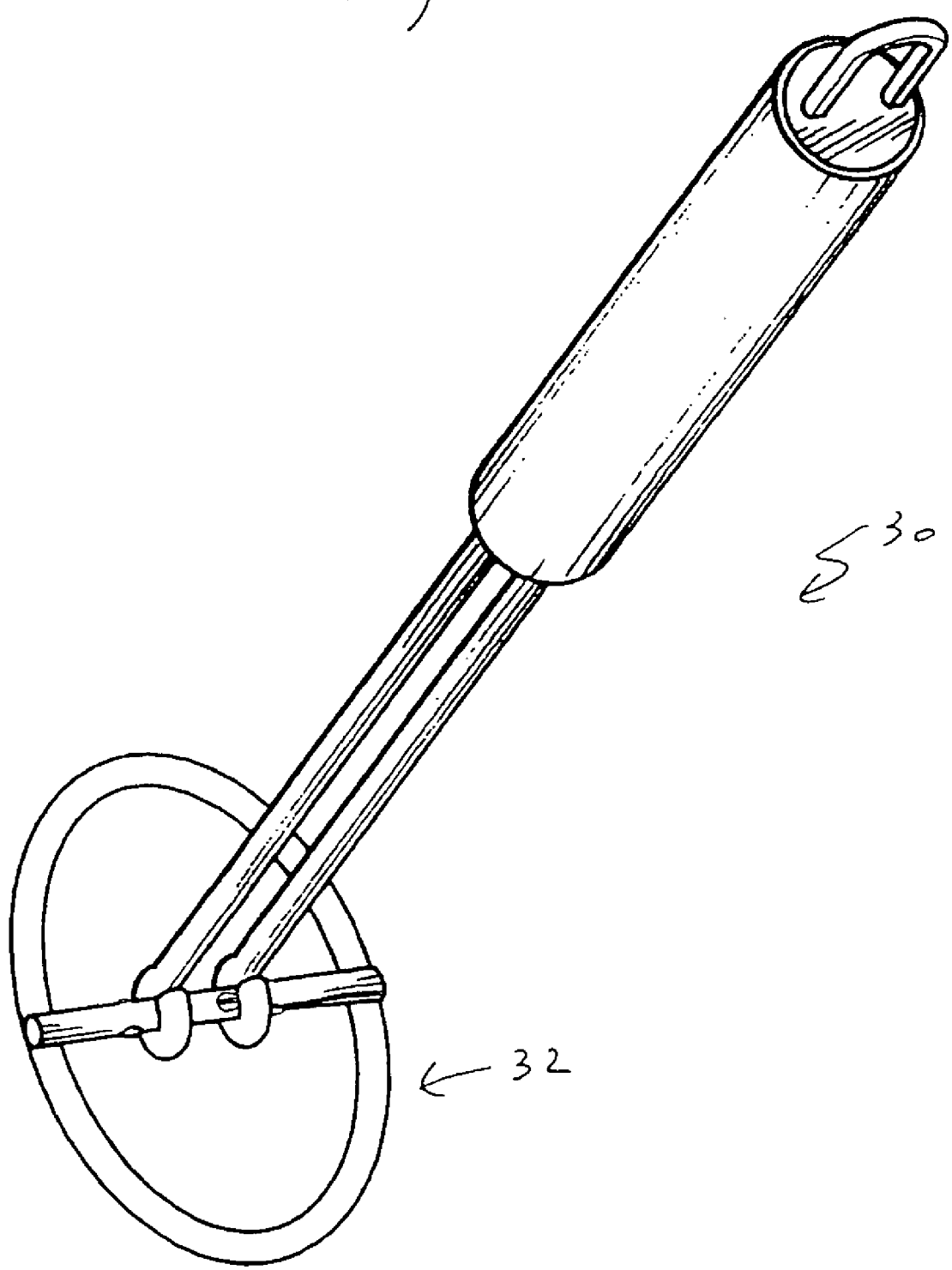

CULINARY UTENSIL

This application is a continuation of application of U.S. Ser. No. 10/682,232 filed Oct. 9, 2003, now abandoned.

BACKGROUND OF THE INVENTION

The present invention relates to a culinary utensil and in particular a culinary whisk.

Conventional culinary whisks can take a variety of forms the most common form being what is known a balloon whisk. Such a whisk usually comprises a handle and a utility portion formed of a plurality of metallic wire loops spaced angularly about the axis of the handle to define a generally balloon like shape. One disadvantage of this type of culinary whisk is that it is relatively bulky, and mixing or beating foodstuffs thereby is often not satisfactory because the loops at their lower regions often cannot effectively reach into any corners in a container containing the foodstuffs. Another disadvantage is that after use the loops of wire, which are fixed to the handle, are difficult to clean. Yet another disadvantage is that the balloon shape of the wires takes up a lot of storage space for example in a drawer.

SUMMARY OF THE INVENTION

The present invention seeks to provide a utensil which addresses these problems, or at least to provide an alternative to the public.

According to a first aspect of the present invention, there is provided a culinary whisk comprising an elongate handle, and a generally planar utility portion connected to the handle so as to be pivotably movable about an axis perpendicular to the axis of the handle.

Preferably, the utility portion may comprise a plurality of wires. The utility portion may suitably comprise a generally planar wire loop and a coil of relatively fine wire extending around the wire loop. The coil of wire may be loosely wound around the wire loop to allow limited movement of the coil on the loop.

The wire loop may be provided with a crosspiece to which the pivotable connection is made. The handle may be joined to the wire loop by a pair of legs extending from the handle. In particular, the legs may comprise bent over end regions bent around said crosspiece.

The crosspiece may be provided with lugs preventing lateral movement of the wire loop relative to the legs.

The wire loop may alternatively be connected to the handle by other means such as a universal joint.

The crosspiece and the rest of wire loop may substantially be arranged on different planes for connecting the wire loop to the handle. Alternatively, the crosspiece and the rest of the wire loop may substantially be arranged on a same plane.

The wire loop may be formed with at least one pointed region. Preferably, the wire loop may be of heart shaped. The wire loop may also be of oval shaped. The wire loop may also be of triangular shaped.

BRIEF DESCRIPTION OF THE DRAWINGS

Some embodiments of the present invention will now be described by way of example and with reference to the accompanying drawings, in which:—

FIG. 1 shows a perspective view of a first embodiment of a culinary whisk according to the present invention;

FIG. 2 shows an alternative perspective view of the culinary whisk shown in FIG. 1 in a different configuration;

FIG. 3 shows a perspective view of the culinary whisk shown in FIG. 1 with a length of wire removed;

FIG. 5 shows a perspective view of a second embodiment of a culinary whisk according to the present invention;

FIG. 6 shows an alternative perspective view of the culinary whisk shown in FIG. 5 in a different configuration; and FIG. 7 shows a perspective view of the culinary whisk shown in FIG. 7 with a length of wire removed.

DETAILED DESCRIPTION OF PREFERRED EMBODIMENTS

Figure 4:
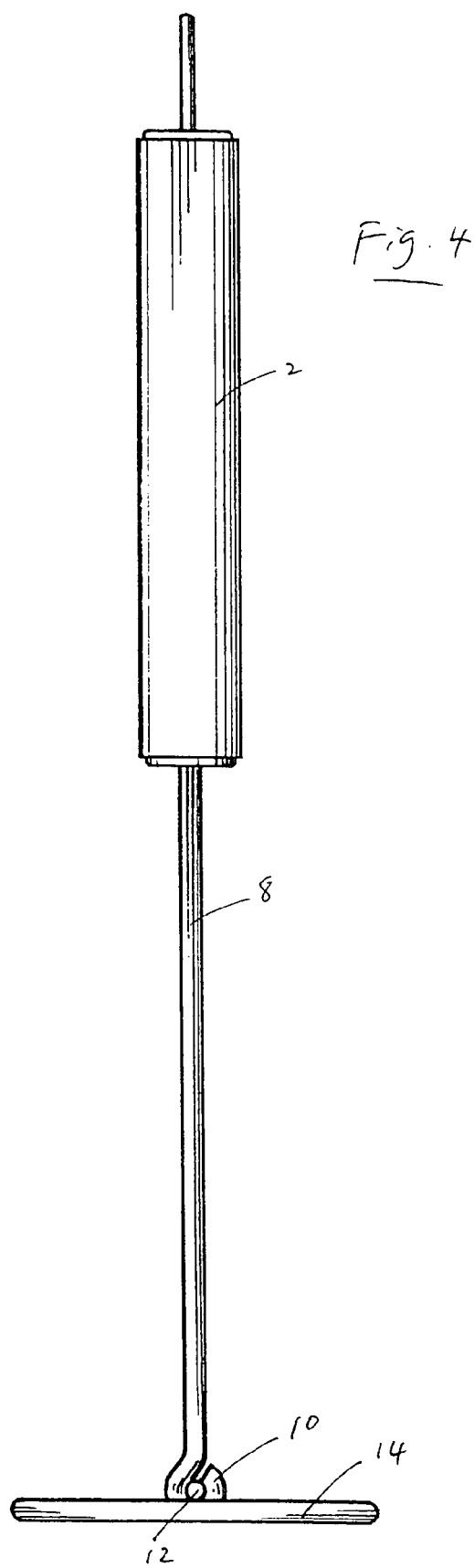
FIG. 4 shows a side view of the culinary whisk shown in FIG. 3.

Referring to the figures, FIGS. 1 to 4 show a first embodiment of a culinary whisk according to the present invention. The culinary whisk, generally designated 1, comprises a handle 2 of cylindrical shape and a utility portion 4. The handle 2 is provided with a hanging hook 6 at its upper end. A pair of legs 8 extends from the opposite lower end thereof. The handle 2 is connected to the utility portion 4 via the pair of legs 8. The utility portion 4 comprises an arrangement having a plurality of wires which in use serves to effectively contact the foodstuff over a wide area thereby effectively aerating the foodstuff on beating. In the preferred embodiment there is a main loop 14 of stiff wire having a rod-like crosspiece 12. The legs 8 have respective fingers 10 at their lower ends which curve around the crosspiece 12 which extends laterally relative to the axis of the handle 2 such that the utility portion 4 of the whisk 1 can pivotably move about the lateral axis of the crosspiece 12. Lugs 16 are provided at the crosspiece 12 adjacent the curved fingers 10 for confining the relative lateral position of the utility portion 4 and the handle 2 of the whisk 1. The utility portion 4 is provided with a coil of fine wire 18 spiraling along the loop 14 extending along at least the majority of the loop 14. The coil of wire 18 is sufficiently fine so that the coil of wire 18 has a degree of resilience and is loosely constructed so that it can move slightly relative to the wire loop. As can be seen in this embodiment, the loop 14 of the utility portion 4 is generally of heart-shaped having a pointed region 20 and two rounded regions 22.

For the sake of clarity, FIGS. 3 and 4 also show the culinary whisk 1 but without the length of wire 18 spiraling along the loop 14. It is shown in these figures that the crosspiece 12 is welded to and arranged to join the loop 14 on its upper side.

FIG. 1 shows the culinary whisk 1 with the utility portion 4 in a configuration in which the pointed region 20 thereof points upwardly. FIG. 2 shows the culinary whisk 1 with the utility portion 4 in an alternative flattened configuration in which both the sharper region 20 and the two round regions 22 are at about the same horizontal level. As shown by these two figures, the utility portion 4 of the whisk 1 can pivot about the axis of the crosspiece 12 attached to the loop 22. This is especially useful in whisking or beating a foodstuff in a bowl as the plane of the utility portion can follow the sides of the bowl.

The construction of the pointed region 20 of the utility portion and the ability to pivot facilitates the reaching into a narrow corner in a dish or other receptacle.

FIGS. 5 to 7 show a second embodiment of a culinary whisk 30. The culinary whisk 30 is generally similar to the culinary whisk 1 except the utility portion 32 and specifically the wire loop is oval-shaped.

It will be appreciated that a wide variety of other shapes and constructions of the utility portion may be used, for example a triangular-shaped utility portion may be used. Shapes having at least a region of narrowed or pointed form for reaching into tight corners are preferred. It is also to be appreciated that while the wire loop of the utility portion may be a closed loop, a loop with an open region may also be used.

The invention claimed is:

1. A culinary whisk comprising:
    an elongated handle;
    a generally planar utility portion configured and constructed to aerate a foodstuff, wherein the utility portion includes a generally planar loop and a coil of wire extending around the loop; and
    a crosspiece extending generally transversely relative to the handle, and positioned at one end of the handle, wherein the cross piece is connected to both the planar loop and the handle so that the cross piece defines a pivot axis about which the utility portion pivots, whereby the utility portion and the handle are pivotally movable relative to each other.

2. A culinary whisk according to claim 1 wherein the coil of wire is loosely wound around the loop to allow limited movement of the coil on the loop.

3. A culinary whisk according to claim 1 wherein the one end of the handle includes a pair of legs which are connected to the crosspiece.

4. A culinary whisk according to claim 3 wherein the legs comprise bent over end regions bent around the crosspiece to provide a pivoting connection thereto.

5. A culinary whisk according to claim 4 further comprising lugs on the crosspiece configured to prevent lateral movement of the loop relative to the legs.

6. A culinary whisk according to claim 1 wherein the loop includes at least one pointed region.

7. A culinary whisk according to claim 1 wherein the loop is heart shaped.

8. A culinary whisk according to claim 1 wherein the wire is of oval shape.

9. A culinary whisk according to claim 1 wherein the loop is of triangular shape.

10. A culinary whisk according to claim 1 wherein the loop is formed of wire having a greater diameter than that of the coil.

11. A culinary whisk according to claim 1 further comprising members on the crosspiece configured to substantially prevent lateral movement of the handle relative to the crosspiece.

* * * * *